Dec. 15, 1970    SHIGEO KUWAYAMA ET AL    3,548,359

ELECTRIC HEATING ELEMENT

Filed Nov. 26, 1968

INVENTORS
SHIGEO KUWAYAMA
MOTOHIKO YAGI
TETUO IKEDA

BY *Sughrue, Rothwell, Mion, Zinn & Macpeak*

ATTORNEYS.

United States Patent Office 3,548,359
Patented Dec. 15, 1970

3,548,359
ELECTRIC HEATING ELEMENT
Shigeo Kuwayama, Motohiko Yagi, and Tetuo Ikeda, Kanagawa, Japan, assignors to Fuji Shashin Film Kabushiki Kaisha, Kanagawa, Japan
Filed Nov. 26, 1968, Ser. No. 779,121
Claims priority, application Japan, June 8, 1968, 43/39,300
Int. Cl. H01c 1/02
U.S. Cl. 338—268          8 Claims

ABSTRACT OF THE DISCLOSURE

An electric heating element is supported within a cylindrical support member made of electrically non-conductive heat resisting material and the cross sectional area of the heating element is larger at positions where the element is or may be in contact with the support member.

BACKGROUND OF THE INVENTION

Field of the invention

This invention relates to an electric heating element using crystalline glass, quartz glass or glass as a support means, with the electric resistance of an electric heating wire lowered where it is or may be brought into contact with the support means.

Description of the prior art

Up to the present time, electric heating elements such as Nichrome wire have been used for heaters, which are generally supported by non-conductive, heat resisting materials. Of late, molded crystalline glass has been developed and used for such support means. The crystalline glass consists of a matrix of, for example; $Li_2O$-$Al_2O_3$-$SiO_2$ or $Li_2$-$Al_2O_3$-$SiO_2$-$MgO$ system, the components of the matrix being crystallized around a simultaneously added nuclei forming agent such as $Zro_2$ or $TiO_2$. The mechanical strength is 2–4 times as much as that of a non-crystallized glass consisting of the same matrix, the transmittivity of infrared ray is excellent and the coefficient of thermal expansion is substantially zero so that there occurs no structural breakage due to a rapid change of temperature. Ordinarily, the crystalline glass tube is used and a spiral Nichrome wire is passed into the tube. In a heater provided with such a heating element, electric current is passed through the Nichrome wire to generate heat and radiant heat is given off through the crystalline glass tube.

Crystalline glass has properties suitable for use as a support for an electric heating element generating heat at a temperature of up to 1100° C. In the ordinary use thereof, however, the red hot electric heating element contacts the support means for a long time although the temperature is not so high, i.e., 600–900° C. and, consequently, the contact part of the support means becomes turbid, resulting in cracks or sometimes rupture.

In order to solve the above mentioned problem, it has been proposed to provide a layer having a higher heat resistance at a contact point between the electric heating element and the support means. Another known method consists in forming a part of spiral electric heating element larger in diameter than the remainder, which is called a "D.L. winding," and only the larger diameter part is brought into contact with the support means. The former is not so good for appearance and the latter is not preferred, in particular, in the case where a ribbon-shaped Nichrome wire is used or where the same is used as a linear resistance.

SUMMARY OF THE INVENTION

In the method of the invention, a Nichrome wire is doubled along positions where it is or may be in contact with the support means and the doubled part is welded or spot welded to lower the electric resistance of this part. Thus, the temperature of said support means is low during use and it is protected from rupture.

BRIEF DESCRIPTION OF THE DRAWINGS

FIG. 1C is a side elevation.

DESCRIPTION OF THE PREFERRED EMBODIMENTS

Figure 1A:
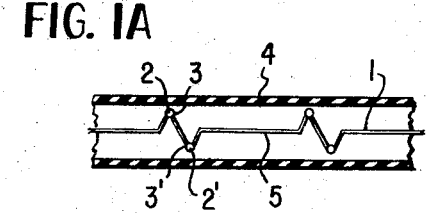
FIGS. 1A, 1B and 1C are schematic illustrations of a preferred form of the electric heating element of this invention, FIG. 1A comprises a vertical cross sectional view, FIG. 1B comprises a horizontal cross sectional view
Figure 1C:
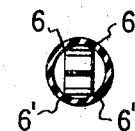
Figure 1B:
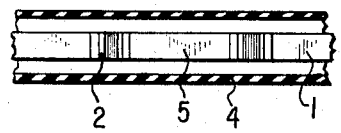

Referring to FIG. 1, an electric heating band of this invention is provided in a tube of crystalline glass, (A) showing a vertical cross sectional view and (B) a horizontal cross sectional view. Electric heating band 1 has bent parts 2, 2", the lower and inside parts of which are spot welded to each other to be in electric conjunction. The electric heating element having such parts at a suitable interval is positioned in heat resisting tube 4. Linear part 5 of electric heating band 1, therefore, is not in direct contact with the inner wall of the tube. Even when electric current passes through electric heating element 1 and the linear part 5 is heated to a high temperature, for example, 920° C., contact parts 6, 6" of electric heating band 1 with the inner tube can be held to such a low temperature that there is no deterioration of the material of the tube.

Figure 2A:
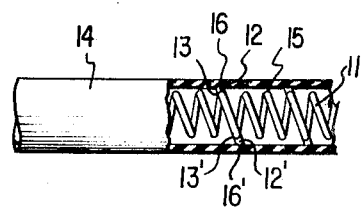
FIGS. 2A and 2B are schematic illustrations of another embodiment of the invention as applied to an electric heating wire wound spirally in a heat resisting tube, FIG. 2A showing a partially sectional view and FIG. 2B a side elevation.
Figure 2B:
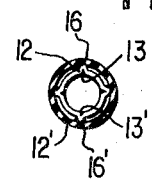

FIG. 2 shows another typical embodiment of the invention, wherein an electric heating wire (A) showing a partially sectional view and (B) a side elevation. An electric heating wire 11 is wound spirally while 12, 12' are bent parts and at 13, 13' are welded parts. A heat resisting tube 14 receives electric heating wire 11. At 15 is a non-contact part of electric heating wire 11. Contact points 16, 16' engage the inner wall at suitable intervals. This assembly gives similar effects to that of FIG. 1.

Figure 3A:
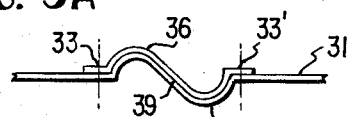
FIGS. 3A and 3B, FIGS. 4A and 4B and FIGS 5A and 5B are schematic illustrations of other embodiments of the electric heating element of this invention with (A) a side elevation and (B) a plan view respectively.
Figure 3B:

FIG. 3 is an effort to provide in an electric heating element, a part wherein the electric resistance is lowered, in which case electric heating band 31 and segmented electric heating band 39 are spot welded at 33, 33' with both bends in a superposed wave form. The superposed part has its electric resistance lowered and can be used as contact points with the heat resisting tube (not shown) in which the electric heating band is to be inserted.

Figure 4A:
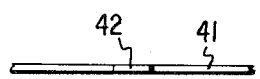
Figure 4B:
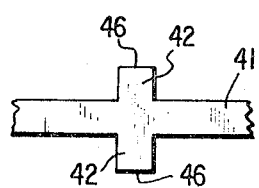

FIG. 4 is a modification of the invention, wherein a wide part 42 is provided in electric heating band 41 at right angles to the direction of electric current to lower the electric resistance of this part with the end 46 thereof being used as a contact point.

Figure 5A:
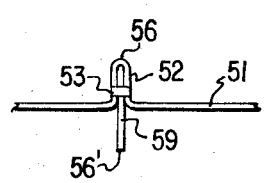
Figure 5B:
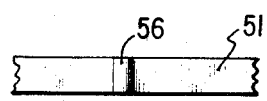

FIG. 5 shows another modification of the invention, wherein electric heating band 51 is bent at 52 while holding another electric heating band 59 and spot welded at 53 with the end parts 56, 56' being used as contact points.

The invention will further be illustrated by the following examples.

EXAMPLE 1

To an electric heating band of Fe-Cr FCH2, having a width of 8 mm. and thickness of 0.16 mm. bands of the same material were spot welded, having a length of about 8 mm., at an interval of about 30 mm. as shown in FIG. 3, formed into a wave configuration and cut to a length of 250 mm.

Eight tubes of transparent crystalline glass, each having an outer diameter of 4.3 mm., thickness of 0.6 mm. length of 250 mm., coefficient of thermal expansion of $+6 \times 10^7$ cm./cm.° C. and maximum practical temperature of 800° C., were arranged in parallel and bonded with a heat resisting adhesive to form a panel. The formed electric heating bands were inserted in the tubes and spot welded in series. The resulting panel is a good electric heating heater. When 107 v. is applied to the electric heating panel, the power consumption is 480 w., the surface load density is about 12.5 w./cm.$^2$ and the surface temperature of the linear part is 970° C. It was made apparent by a running test that no deterioration in the contact parts formed.

EXAMPLE 2

An electric heating element was used as linear resistor heater without subjecting the same to the workings of the invention and formed into a panel in the same manner as in Example 1. When 107 v. was applied to the electric heating panel, the power consumption was 470 w., the surface load density was 12.2 w./cm.$^2$ and the electric heating bands contacted the tube here and there where the surface temperature of the band lowered to form spots. After the passage of electric current in 24 hours, there was black color at the contact parts. A turbidity was generated after 72 hours and a breaking by cutting occurred after 1 week.

It is to be understood that the foregoing illustrations referring to the accompanying drawings and examples are illustrative only and the scope of the invention is not limited thereto.

A great many modifications are possible in the electric heating element insofar as it comprises a structure that a substantial cross sectional area of the electric heating element at positions where the electric heating element is or may be in contact with a support means is enlarged to lower the electrical resistance and surface temperature. A sheet-shaped material may be used as a support means with similar effects.

What is claimed is:

1. In an electric heater including a resistor heating element within an insulating member surrounding the same and acting as a support means, the improvement wherein; the cross-sectional area of the electric heating element in the plane perpendicular to the direction of electric current is enlarged at positions where the electric heating element is in contact with said support means to thereby lower the electrical resistance of the electric heating element at these positions.

2. The heater as claimed in claim 1 wherein said heating element comprises a heating band of wave portions spotwelded to each other at their junction points.

3. The heater as claimed in claim 1 wherein said heating element comprises a spiral electric heating wire having double bent peripheral portions in contact with the wall of said support means.

4. The heater as claimed in claim 3 wherein said double bent portions are in the form of radially extending equally spaced circumferential projections.

5. The heater as claimed in claim 1 wherein said heating element comprises a heating band having a spotwelded segmental portion bent into wave form.

6. The heater as claimed in claim 1 wherein said heating element comprises a thin electric heating band having multiple portions extending at right angles to the longitudinal axis thereof with the ends of said right angle portions contacting said support means.

7. The electrical heater as claimed in claim 1 wherein said element comprises a reversely bent band which captures a second band therebetween, said bands being spotwelded to form opposed projections to contact said support.

8. The heater as claimed in claim 1 wherein said heating element comprises a band of conductive metal and said support means comprise a crystalline glass tube.

References Cited

UNITED STATES PATENTS

| | | | |
|---|---|---|---|
| 2,419,655 | 4/1947 | Reiser | 338—259X |
| 2,856,494 | 10/1958 | Fruth | 338—268X |
| 3,346,723 | 10/1967 | Mohn | 338—268X |

ELLIOT A. GOLDBERG, Primary Examiner

U.S. Cl. X.R.

338—234